United States Patent [19]

Mak et al.

[11] Patent Number: 4,990,317

[45] Date of Patent: Feb. 5, 1991

[54] PROCESS FOR THE TREATMENT OF HOT WASTE GAS CONTAINING HYDROGEN CHLORIDE

[75] Inventors: Kai K. Mak, Concord; Rudy G. Novak, Knoxville, both of Tenn.

[73] Assignee: International Technology Corporation, Knoxville, Tenn.

[21] Appl. No.: 439,629

[22] Filed: Nov. 20, 1989

[51] Int. Cl.$^5$ .................. B01D 53/14; B01D 53/34
[52] U.S. Cl. .................... 423/215.5; 423/240
[58] Field of Search ................ 423/240, 215.5

[56] References Cited

U.S. PATENT DOCUMENTS

| | | | |
|---|---|---|---|
| 1,441,696 | 1/1923 | McNeil et al. | 252/190 |
| 2,813,000 | 11/1957 | Quittenton | 423/240 |
| 3,054,653 | 9/1962 | Barton et al. | 423/245.2 |
| 3,589,864 | 6/1971 | Ezaki | 423/481 |
| 3,660,019 | 5/1972 | Predikant et al. | 423/185 |
| 3,789,109 | 1/1974 | Lyon et al. | 423/240 |
| 3,826,816 | 7/1974 | McCormick | 423/497 |
| 3,969,482 | 7/1976 | Teller | 423/235 |
| 3,984,206 | 10/1976 | Winnen | 422/198 |
| 4,022,869 | 5/1977 | Saitoh et al. | 423/420 |
| 4,208,383 | 6/1980 | Kisters et al. | 423/215.5 |
| 4,215,095 | 7/1980 | Harris et al. | 423/240 |
| 4,246,255 | 1/1981 | Grantham | 423/659 |
| 4,292,285 | 9/1981 | Nakao et al. | 423/210 |
| 4,293,524 | 10/1981 | Teller et al. | 423/169 |
| 4,375,455 | 3/1983 | Teller et al. | 423/210 |
| 4,463,691 | 8/1984 | Meenan et al. | 110/346 |
| 4,474,587 | 10/1984 | Matsumoto et al. | 55/71 |
| 4,539,190 | 9/1985 | Shinoda et al. | 423/240 |

Primary Examiner—Jeffrey E. Russel
Assistant Examiner—Anthony L. Burke
Attorney, Agent, or Firm—Luedka, Hodges & Neely

[57] ABSTRACT

The specification discloses a process for the treatment of waste gas containing hydrogen chloride wherein the gas is at an elevated temperature in the range of from about 300° F. to about 3000° F. and is produced from the thermal decomposition of material contaminated with hazardous chlorinated organic compounds. The waste gas is contacted in a reaction unit with an alkaline brine solution under conditions such that hydrogen chloride in the waste gas reacts with the alkali to form a chloride salt and water. The heat of the gas evaporates water from the solution to maintain the salt concentration sufficiently high to cause the formation of salt crystals in the solution. The gas is conducted from the reaction unit following contact with the solution under conditions such that the gas includes water evaporated from the solution. The salt crystals are removed as a solid product of the process and water and alkali are added to compensate for water vaporized from the solution and alkali consumed in the reaction. The process requires no external heat input and there is no liquid discharge.

20 Claims, 2 Drawing Sheets

PROCESS FOR THE TREATMENT OF HOT WASTE GAS CONTAINING HYDROGEN CHLORIDE

The present invention relates to processes for treating waste gas containing hydrogen chloride and more particularly relates to a process of this type which is capable of producing essentially only solid and gaseous products to substantially eliminate the need for treatment or disposal of a liquid scrubber blowdown.

Hydrogen chloride-containing waste gases are a product of numerous industrial processes such as the incineration of materials contaminated with hazardous chlorinated organic compounds. Venting of the gases to the atmosphere without further treatment has been greatly curtailed by the imposition of strict limits on the permissible chloride content of the gases. As a result, it has become necessary in most cases to reduce the HCl concentration of the gases to within acceptable ranges.

Numerous processes have been developed to address the problem of HCl removal from waste gases. These processes have met with varying degrees of success but on the whole have been less than satisfactory, particularly in terms of the economies of operation and the complexity and number of separate processing steps which are required to carry out the methods. These problems have become especially evident in the case of treatment of contaminated materials such as PCB contaminated soil, for example, where it is normally required that the processing equipment be brought to the site. Known processes have typically employed apparatus which is difficult to transport from site to site due to the size and quantity of the equipment needed for the various operations.

A major problem with known processes for treating chloride-containing waste gases involves the generation of a voluminous liquid discharge of relatively high chloride concentration which typically cannot be released to the environment consistent with existing environmental regulations. Thus, it is usually necessary to treat the discharge accompanying the reaction before it can be released which adds to the cost of the process. Such practices are also wasteful in terms of water usage.

Although so-called "spray drying" processes are known for treating waste gases containing HCl without a liquid discharge, these processes suffer from the disadvantage that the equipment required to carry out the process is very large and complex making it difficult or impossible to transport the equipment from site to site. These processes are also difficult to control, tend to be uneconomical, and usually require elaborate provision for the removal of particle and dust entrainment, which is a particularly difficult problem with totally dry processes.

Normally the waste gases contain, in addition to HCl, various other objectionable constituents such as, for example, suspended particulates including ash and heavy metals. In the usual case, it is required that these constituents also be removed or reduced in concentration before the gas is released to the atmosphere. This tends to further complicate the process, especially with regard to any liquid effluent clean up efforts.

Accordingly, it is an object of the present invention to provide a process for the treatment of waste gas containing HCl which avoids the generation of a liquid discharge.

It is another object of the invention to provide a process of the character described which employs a minimum of easily controllable processing steps.

An additional object of the invention is the provision of a process of the character described which can be carried out using readily transportable equipment to facilitate on-site treatment.

A further object of the invention is the provision of a process of the character described in which the gas is produced from the thermal decomposition of material containing hazardous chlorinated organic compounds and includes, in addition to the HCl, ash, heavy metals and other environmentally objectionable constituents, and wherein the process is adapted to remove these other constituents as well.

The above and other objects and advantages of the invention may be further understood by reference to the following detailed description of preferred embodiments when considered in conjunction with the accompanying drawings in which:

Before making specific reference to the drawings, the more general features of the invention will be described to facilitate a better understanding thereof. Basically, the invention includes a process for the treatment of waste gas containing HCl wherein the gas is at an elevated temperature in the range of from about 300° F. to about 3000° F. and is produced from the thermal decomposition of material contaminated with hazardous chlorinated organic compounds. Such gas may be a product of the pyrolysis of gas produced from the heating of soil or other substrates containing PCBs, dioxins, or the like, in a kiln or other treatment apparatus, for example. As is common in this type of operation, the gas produced in the kiln is subjected to a secondary combustion treatment resulting in the release of chlorides which are present in the waste gas mainly in the form of HCl. The temperature of the waste gas may be in the neighborhood of from about 1600° F. to about 3000° F., for example, as it exits the secondary combustion treatment.

The process comprises contacting the waste gas in a reaction unit with an alkaline brine solution under conditions such that HCl present in the waste gas reacts with the alkali to form a chloride salt (hereinafter referred to as salt) and water so that the chloride concentration in the gas is reduced. A preferred alkali for use in the process is sodium hydroxide. Sodium carbonate and calcium hydroxide (lime) may also be used. Preferably, the alkaline brine solution is provided in a large excess over cooling and neutralization requirements to minimize the formation of submicron salt particulates in the gas leaving the unit.

The heat of the waste gas is utilized to evaporate water from the solution to maintain the concentration of the salt sufficiently high to cause the formation of salt crystals in the solution. The gas is conducted from the reaction unit following contact with the solution under conditions such that the gas includes the water which is evaporated from the solution. The salt crystals are removed from the reaction unit as a solid product of the process and, under steady state conditions, water and alkali are added to the reaction unit to compensate for water vapor carried out of the unit with the gas and alkali which is reacted. As a consequence, HCl is removed from the waste gas without the generation of a liquid discharge.

It is contemplated that the gas product may under some circumstances include residual unreacted HCl. In order that the residual HCl may be substantially removed before release of the gas to the atmosphere, the process further comprises treating the gas product to remove residual HCl. According to this aspect of the invention, the gas is conducted from the reaction unit to a scrubber and contacted with an alkaline solution to remove residual HCl and is then given a final wash with fresh water using appropriate equipment such as a demister, for example, before release to the atmosphere. The downflow in the scrubber containing salt formed from the residual HCl is conducted back into the reaction unit. An excess of alkali is preferably provided in the alkali solution over and above that required for reaction with the residual HCl. This excess alkali and the water in which it is contained replenish alkali consumed in the unit and water that is carried away as vapor in the gas product.

Often the waste gas includes, in addition to chlorides, suspended particulates such as heavy metals and ash. In accordance with an additional feature of the invention, the process accomplishes removal of the suspended particulates prior to the removal of the HCl by quenching the gas using a water spray to reduce the gas temperature to a temperature in the range of from about 300° F. to about 600° F. under conditions such that the water is completely vaporized in the waste gas, and the HCl in the gas remains substantially unreacted during quenching. The suspended particulates are then substantially removed from the waste gas as in a bag house, for example, while maintaining the temperature of the gas above about 300° F., after which the gas is passed to the reaction unit.

Under certain conditions such as where the waste gas contains very heavy concentrations of both HCl and suspended particulates, the invention contemplates a process for removal of all of these constituents in a single step wherein the waste gas is contacted in a reaction unit with an alkaline brine spray under conditions such that HCl in the waste gas reacts with the alkali to form salt and water. The salt and water are collected in the spray droplets along with the suspended particulates, resulting in a gas product which has a reduced concentration of HCl and particulates. The spray accumulates in the unit to provide an alkaline brine solution containing the collected salt and particulates. The heat of the waste gas is utilized to evaporate water from the spray to maintain the salt concentration in the solution sufficiently high to cause the formation of salt crystals therein. The particulates and salt crystals are separated out of the solution as a solid product of the process. The gas product is conducted from the reaction unit following contact with the spray under conditions such that it includes the water evaporated from the spray. Again, HCl is removed from the waste gas without the generation of a liquid discharge.

The spray is preferably provided by withdrawing a portion of the solution from the unit and adding alkali and water to the withdrawn portion prior to contact with the gas. The amount of alkali and water are sufficient to compensate for alkali consumed in the unit by reaction with HCl and water evaporated from the spray. It is also preferred that at least a portion of the alkaline brine solution be continuously withdrawn from the unit and substantially cleared of particulates and salt crystals before it is used in the spray.

Figure 1:
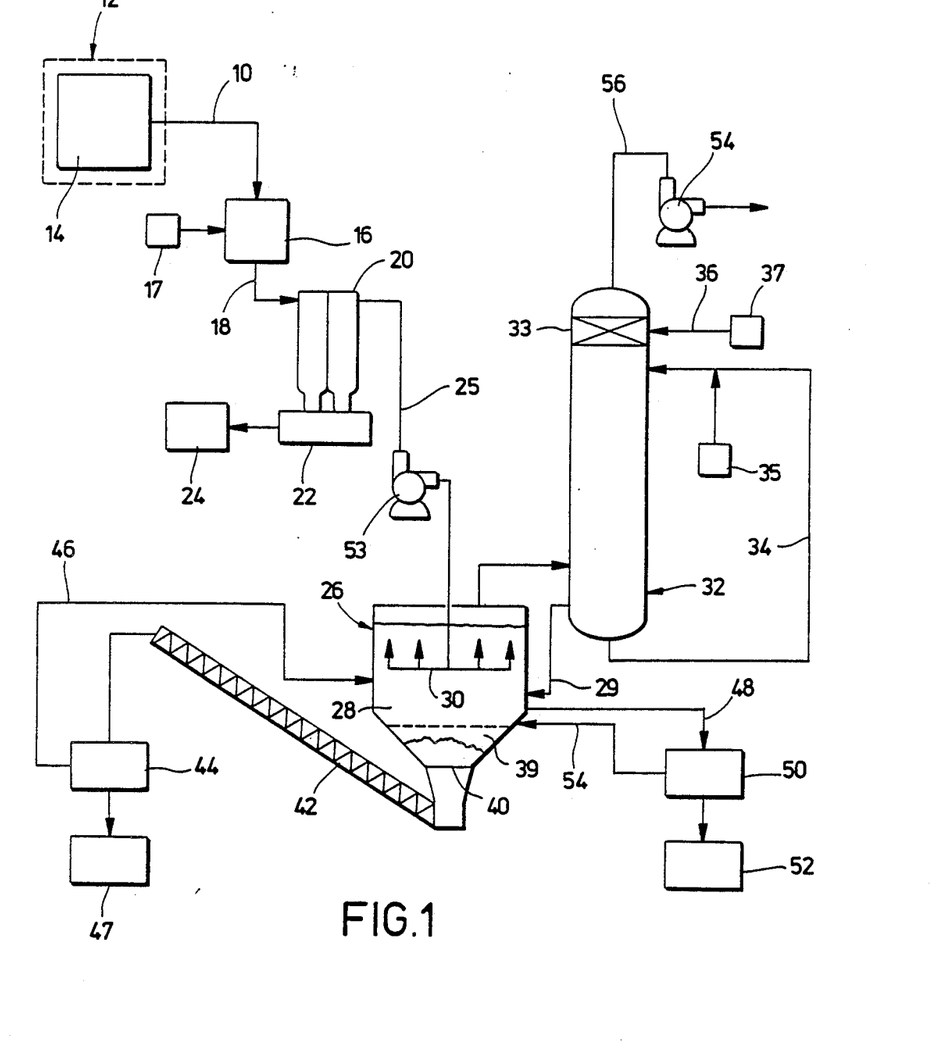
FIG. 1 is a flow diagram illustrating one embodiment of the present invention.

Referring now to the drawings in more detail, FIG. 1 illustrates one embodiment of the process of the present invention in which waste gas to be treated is a product of a system for thermally decomposing material contaminated with hazardous chlorinated organic compounds. As previously mentioned, the contaminated material may be soil or other substrate, and may be in an essentially solid form such as granules, clumps and the like as well as in a liquid or slurry form.

The contaminants present in the material may include, for example, hazardous organic compounds such as PCBs, dioxins, hydrocarbons of widely varying composition, some or all of which are chlorinated, and other hazardous chlorinated organic compounds capable of removal from the material and destruction by thermal treatment.

The system is indicated in the drawing diagrammatically at 12 and may be of the type used to treat essentially solid material such as soil to effect removal through desorption, vaporization or other means so that the contaminants are released themselves as vapor without significant chemical alteration and then collected out of the gas or destroyed by exposure to a high temperature. One such system employs a kiln in which the soil is heated to vaporize contaminant substances, and from which the vaporized products are conducted for subsequent thermal destruction in a secondary combustion unit represented diagrammatically at 14. In the unit 14, the gas is subjected to a high temperature treatment in the neighborhood of 2200° F. to 3000° F. to destroy volatilized contaminants and objectionable products thereof.

Following high temperature treatment, the constituents of the gas may include, in addition to varying concentrations HCl, suspended particulates such as ash, entrained soil particles, carbonized materials, and heavy metals. The relative concentrations of these other constituents and their presence or absence varies widely depending primarily on the condition of the contaminated material and the manner of the thermal treatment to which the material is subjected.

In the embodiment of FIG. 1, the gas exits the secondary combustion unit 14 in conduit 10 which delivers the gas to a water spray chamber 16 where the gas is quenched to reduce its temperature to about 300° F. to 600° F. Preferably, the pressure of the gas in and following quenching in the chamber 16 is maintained slightly below atmospheric to substantially eliminate exfiltration of the gas and the constituents thereof to the outside environment, and to facilitate maintenance of the gas constituents such as HCl and water in the gaseous state. Water employed to quench the gas as at 17 is preferably substantially free of contamination.

The water applied in the chamber 16 vaporizes and is carried along with the gas as it exits the chamber 16 with the temperature reduction of the gas being due in substantial part to heat absorbed from the gas when the water vaporizes. HCl in the gas remains substantially unreacted as the gas passes through the chamber 16 and is cooled.

From the chamber 16, the quenched gas is delivered in conduit 18 to a particulate removal system, preferably a bag house 20, in which ash, heavy metals and other suspended particulate matter in the gas are removed. The bag house 20 and associated piping, etc., are preferably insulated to maintain the temperature of the gas substantially in the range of from about 300° F. to 600° F. Filtered particulates are collected in a hopper or receptacle as at 22 and then discharged as indicated to a holding vessel 24 for disposal.

After removal of particulates, the gas passes in conduit 25 to a reaction unit 26 of suitable configuration in which the gas is contacted with a large excess of an alkaline brine solution 28 under conditions such that HCl in the gas reacts with the alkali to form salt and water. In the illustrated embodiment, this is accomplished by releasing the gas into the solution 28 beneath its upper surface using a distribution apparatus which is effective to promote uniform, intimate, and efficient contact between the solution 28 and the gas. One such apparatus is a perforated sparger which is illustrated diagrammatically at 30 and arranged to introduce the gas in a horizontal plane a predetermined level below the surface of the solution.

As mentioned earlier, a preferred alkali for use in the invention is sodium hydroxide (NaOH) and this compound will be designated in the remaining description for convenience, it being understood that other alkali agents as have been indicated may find application in the invention.

Contact between the gas and the solution 28 results in a transfer of heat from the gas to the solution. The heat transfer rate is controlled to provide continuous evaporation of water from the solution to maintain the salt concentration sufficiently high to cause the formation of salt crystals, thereby facilitating continuous removal of salt from the solution.

It is contemplated that under certain conditions, residual HCl may be present in the gas following contact with the solution 28. To remove residual HCl, the gas is directed into a scrubber 32, preferably a packed column of suitable configuration, where it is washed by contact with a downwardly cascading caustic wash solution. Residual HCl in the gas reacts with NaOH in the wash solution to form a relatively dilute alkaline brine which collects in the lower part of the scrubber 32 and is discharged into the unit 26 in conduit 29 for replenishing lost water and reacted NaOH as will be described. In a preferred embodiment, the scrubber 32 is provided with a demister section 33 at its top and the gas is conducted through the demister before it is released into the atmosphere.

The washing in the scrubber 32 is preferably accomplished in two stages. The first or initial washing stage is performed in the section containing the packing by introducing a caustic solution via recycle line 34 adjacent the top of the packing using suitable distribution apparatus so that the caustic solution flows down through the packing countercurrently with the gas. The caustic is delivered to line 34 from a supply indicated digramamtically at 35. The NaOH content of the solution entering the unit 26 from the scrubber 32 is preferably sufficiently high to fully replenish NaOH consumed in the solution 28 by the reaction with HCl.

The second wash stage is a final rinse, and is carried out using fresh water which is introduced into the scrubber 32 in the demister by suitable means from fresh water conduit 36 connected to a source 37 such as a well line or a city water line, for example. The fresh water flows down through the demister section 33 and combines with the caustic solution introduced adjacent at the top of the packing.

Generally speaking, an overall water balance is achieved in the process wherein the water contained in the brine solution discharged into the unit 26 in line 29 from the scrubber 32 equals the water added to the gas stream as a result of vaporization in the unit 26 plus any small amount of unremoved included water present in the solids taken off from the unit, as will be described. This is done in order to maintain a substantially constant level in the unit 26 and is most easily accomplished by controlling the rate of water added in the scrubber 32 using a level detector (not shown) provided in the unit. Thus, there is no significant aqueous discharge from the process, providing a material advantage from an environmental standpoint. It will thus be appreciated that the arrangement in which the NaOH-containing brine solution is passed from the scrubber 32 into the unit 26 provides an efficient and economical mode of operation wherein NaOH is simultaneously provided for reaction with residual HCl and with HCl in the incoming gas, while also providing make-up water to maintain a constant solution level in the unit to facilitate continuous removal of crystallized salt under favorable conditions and with no appreciable aqueous discharge.

To facilitate settling of the salt crystals and any other solid material which may be present in the brine solution 28, the unit 26 preferably includes a quiescent zone 39 for settling purposes; and is also frustro-conical in configuration at the bottom to encourage movement of the salt crystals and any other settled material toward a bottom opening 40 of the unit 26. The opening 40 communicates with the feed end of a solid-liquid separation device such as a dewatering screw 42, for example, where the salt and any other settled material along with an included brine portion are removed from the unit 26. The screw 42 operates in a conventional manner to compact the material as the material is delivered toward the discharge end of the screw 42 which is located above the liquid level of the solution 28. As a result, a substantial portion of the included brine portion is separated from the material and drains back into the unit 26 before the material is discharged from the screw 42. The dewatered salt and any other removed settled material is then further treated, preferably by filtration as at 44, to accomplish removal of substantially all the remaining brine, which is then returned in conduit 46 to the brine solution 28 in the unit 26. The dewatered salt and other settled material may then be placed in bulk containers or the like as at 47 for storage, disposal or further treatment.

The brine solution 28 is preferably withdrawn continuously in conduit 48 to provide a change over at a preferred rate of once every 4 minutes to provide a homogeneous mixture for enhancing salt crystal growth. The salt crystals contained in the solution and other unsettled materials are removed using a continuous centrifugal separation device such as, for example, a hydroclone system indicated at 50, where such materials are separated from the solution for removal as a solid product of the process into container means 52. A commercially available hydroclone system suitable for use in the invention is sold under the trade designation KREBS CYCLONE by Krebs Engineers, Menlo Park, Calif. Cleared briny liquid is returned to the unit 26 from the hydroclone system 50 in conduit 54.

As previously noted, the gas entering the unit 26 is at an elevated temperature in the range of from about 300° F. to about 600° F. This heats the brine solution and cools the gas. In this regard, it is preferred that the temperature of both the gas exiting the unit 26 and the brine solution 28 in the unit be maintained in the range of from about 150° F. to about 210° F. It is believed that such a range will be maintained automatically as a result of contact between the incoming gas and the cooler brine solution delivered from the scrubber 32 although auxiliary heat exchange equipment may be employed if necessary. In this temperature range, a preferred salt concentration range of from about 26 to about 30% by weight based on the total weight of the solution is maintained in the unit 26 by vaporization of water to provide a saturated salt solution so that salt crystals are continuously generated for removal as aforesaid.

The temperature of the gas leaving the scrubber 32 will be determined in substantial part by the volume of the recycle wash solution and clean water and caustic entering in conduits 34 and 36. Due to the intimate contact between the gas and the downwardly flowing liquid, a slight temperature decrease of the gas may occur but no need for temperature control is anticipated in this stage of the process.

Movement of the gas through the stages of the process may be assisted by one or more conveying devices which may be located to provide a push-pull arrangement, with one such device 53 being provided ahead of the unit 26 and another such device 54 being located in a gas discharge conduit 56 by which gas exiting the scrubber 32 is discharged into the atmosphere. Preferably, the devices are provided by ID fans of suitable rating and configuration.

Figure 2:
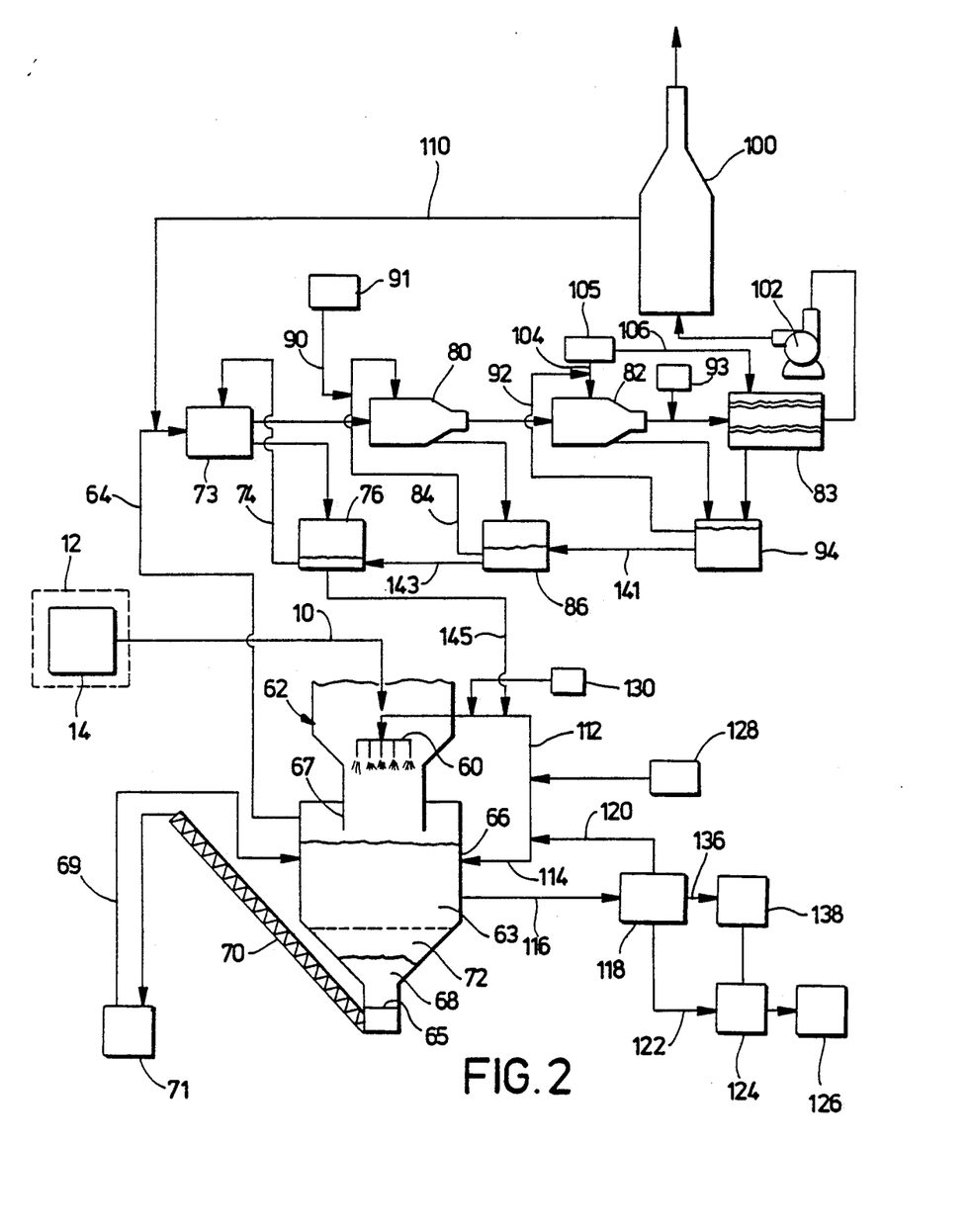
FIG. 2 is a flow diagram illustrating another embodiment of the invention.

Another embodiment of the invention is illustrated in the process flow diagram of FIG. 2. There, the waste gas in conduit 10 exits the secondary combustion chamber 14 of the system 12 referred to above in connection with the description of FIG. 1, and is conducted to the upper section of a reaction unit 62 where the gas makes contact with an alkaline brine spray which is produced by delivering an alkaline brine solution through a suitable arrangement of spray nozzles 60.

The alkaline brine solution delivered to the nozzles 60 has a temperature in the range of from about 150° F. to about 210° F. and includes a predetermined concentration of NaOH so that HCl in the gas reacts with the NaOH to produce salt and water. Because of the high temperature of the incoming gas which may be in the neighborhood of 2200° F. to 3000° F., a considerable quantity of water vapor is generated as a result of contact between the gas and the much cooler spray.

The gas containing water evaporated from the spray leaves the unit 62 in a gas discharge conduit 64, and its temperature decrease caused by contact with the spray is controlled to maintain the temperature of the gas exiting the unit 62 in a preferred range of from about 150° F. to about 210° F. The pressure of the gas in conduit 64 is preferably maintained slightly below atmospheric to guard against exfiltration.

A substantial portion of the salt generated in the reaction along with suspended particles contained in the gas are collected in the unevaporated portion of the brine spray which accumulates in an alkaline brine solution 63 in a lower tank portion 66 of the reaction unit 62. The volume of the solution is preferably maintained substantially constant and the rate at which heat is transferred from the gas to the spray is controlled to maintain the salt concentration in the solution 63 sufficiently high to cause the formation of salt crystals therein as in the embodiment of FIG. 1 previously described.

To facilitate settling and densifying of salt crystals and particulates, it is preferred that the tank 66 have a frustro-conical bottom and be configured to provide a quiescent zone 72 in which the solid material may settle substantially undisturbed. A settled and densified mass 68 is thus formed in the bottom of the tank 66 and, along with an included brine portion, is removed from the tank through a lowermost opening 65 and substantially dewatered by suitable means such as a dewatering screw 70 as described above with reference to FIG. 1. From the discharge end of the screw 70, the dewatered mass comprising salt, ash, heavy metals and other suspended particulates removed from the waste gas stream is further treated as necessary to remove included brine by solid/liquid separation means 71 such as a continuous filtration device, and the removed brine is returned to the tank 66 in conduit 69.

Under some circumstances, the particulate content of the incoming gas may significantly exceed the washing capability of the spray nozzles 60 and significant quantities of dry salt crystals may be formed in the spray. Depending on the conditions, then, considerable quantities of particulates, dry salt and briny mist may tend to become entrained in the gas leaving the unit 62 in conduit 64. To minimize entrainment of these materials, it is preferred that the flow direction of the gas through the spray be substantially perpendicular to the upper surface of the brine solution 63, and that the direction be changed abruptly just above the surface so that the momentum of the particles will tend to carry them into contact with the surface of the solution 63. To this end, the unit 62 is preferably provided with an inner duct 67 terminating just above the surface of the solution 63. The lower edge of the duct 67 acts as a baffle causing the gas to make an abrupt and substantial change in direction just above the surface so that particles in the gas will be carried downwardly by their momentum and impinge upon the surface of the brine solution where they will be collected.

The gas is conducted from the unit 62 in conduit 64 to a gas conditioning unit 73 in which the gas is washed to remove entrained material. The washing medium is drawn from a conditioning unit sump 76 through conduit 74 and then returned to the sump 76 along with liquid which is directed to the sump from other parts of the processing equipment as will be described.

After exiting the gas conditioning unit 73, the gas is preferably subjected to further treatment to remove any particulates and HCl which may be present in the gas. This is desirably accomplished by conducting the gas through a series of venturi scrubbers 80 and 82, and a demister 83, all of which are conventional in design and operation. The scrubbers, for example, may be provided by the nozzle scrubbers sold under the trade designation HYDRO-SONIC by Hydro-Sonic Systems, Inc. of Lonestar, Tex.

In the first venturi scrubber 80, particulate and HCl removal is assisted by the addition of a dilute brine solution entering in line 84 which is recycled from a first venturi scrubber sump 86 where the liquids from the first venturi scrubber 80 are accumulated. Conduit 90 is employed to deliver a caustic solution from a caustic storage mixing unit 91 into the solution in line 84 entering the first venturi scrubber 80. The resulting alkaline brine solution is employed to neutralize the gas flowing through the first scrubber 80 to accomplish removal of the last trace of HCL from the gas which is collected as dissolved salt in the briny contents of the sump 86. The rate of addition of caustic from the unit 91 into line 84 is preferably controlled by an electronic PH monitor 93 located downstream of the second scrubber 82. The PH monitor 93 measures the PH of the gas exiting to scrubber 82, and its signal representing the PH of the gas is used at the unit 91 to maintain a desired PH in the gas exiting the second scrubber 82 through the controlled addition of caustic to the first scrubber 80.

Collection of suspended particulates and mist in the second venturi scrubber 8 is assisted by recycle liquid in conduit 92 which is directed to the scrubber 82 from a demister sump 94. The demister sump 94 collects liquid drainage from the demister 83 which provides a final wash, after which the gas is conducted to a stack 100 using an ID fan 102. Clean water from a suitable source 105 is added to assist in the collection of material in both the second venturi scrubber 82 and the mist eliminator 96 via conduits 104 and 106, respectively.

If desired, a gas recycle stream 110 can be provided for recycling gas from the stack 100 to the line 64 entering the gas conditioning unit 73.

Returning now to the reaction unit 62, the alkaline brine solution for spray nozzles 60 is preferably provided by delivering liquid to the unit 62 from various portions of the process and adding sufficient make up water to keep the level of the solution mixture 63 in the tank 66 substantially constant, compensating for water evaporated from the spray and carried into conduit 64 with the gas, and any unremoved water taken off with the solids from unit 70.

A first source of liquid for the spray nozzles 60 is provided by a cleared brine solution from the tank which is delivered to the nozzles through nozzle feed line 112. The brine solution is withdrawn from the tank in conduit 116, which is connected to a continuous centrifugal separator such as a hydroclone system indicated diagrammatically at 118. In the hydroclone system 118 suspended solids including salt crystals and particulates are removed and a portion of the cleared brine is delivered to the feed line 112 through conduit 120, with the remainder being returned to the tank in conduit 114. Preferably, the conduits 116 and 114 from the tank 66 are substantially above the quiescent zone 72 to minimize the effect of liquid moving into or out of the tank 66 on material settling in the tank 66. Also, the rate of movement of the brine through the system 118 is preferably selected to provide one full volume change over in the tank 66 every four minutes.

From the hydroclone system 118, suspended solids including undissolved salt and particulates which are separated are sent via conduit 122 to a dewatering device 124.

The hydroclone system 118 is conventional in design and operation, and may be provided by the hydroclone system which is sold under the trade designation KREBS CYCLONE by Krebs Engineers, Menlo Park, Calif. The dewatering device 124 may be provided by any of the known continuous filtration or centrifuge systems of which a number are available. From the device 124, the solids are disposed of by suitable means such as containment and/or burial indicated diagrammatically at 126.

A portion of the brine solution cleared in the hydroclone system 118 may be removed from the process as purge liquid via purge line 136, and conducted to a waste treatment facility designated generally at 138 in which the solution is rendered environmentally safe for discharge, disposal or further use, as desired. Such further uses may include ash cooling, for example, in connection with disposal of material treated in the system 12. It is to be noted, however, that the purging of liquid from the hydroclone system 118 is preferably minimized. The capability of dealing with a considerable purge volume may nevertheless be desirable in the event that the waste gases contain unexpectedly high quantities of ash and other suspended particulates, or where the composition of the waste gas is such that a substantial build-up of scale or scum is expected. In such a case, it is preferred to clear the mixture at a higher rate than might normally be the case and to increase both the amount of fresh make up water added to the process and the proportion of aqueous material purged.

A second source of liquid for feed line 112 is provided by means of a caustic solution that is added directly to the feed line 112 such as from a caustic mixing/storage device 128. The amount of caustic which is added is controlled based on the signal level of an electronic pH monitor 130 located in feed line 112 to maintain a predetermined alkalinity of the brine spray solution delivered to the nozzles 60. The pH range of the liquid which is to be maintained in feed line 112 is determined based on the NaOH concentration in the brine spray which is observed to be effective in accomplishing substantially complete reaction with the chlorides in the gas entering the vessel 62.

It is preferred that the sumps 76, 86 and 94 be arranged to permit overflow between them with the solution in demister sump 94 cascading to sump 86 in conduit 141 and the solution in sump 86 cascading to sump 76 in conduit 143. As a result, dissolved salt and unsettled particulates in the briny solution in the sumps are continually advanced to the sump 76. A portion of the solution in the sump 76 is then drawn off in conduit 145 and combined with the alkaline brine solution being directed to the nozzles 60 in feed line 112, providing a third source of a liquid for the spray. Thus, dissolved salt and unsettled particulates present in the solution collected in the sumps 76, 86 and 94 are eventually brought to the tank 66 for removal as described above. Furthermore, it will be appreciated that the brine in conduit 145 has a relatively low concentration of salt and therefore provides a continuous source of make up water to maintain the constant level of the brine 63 in the tank 66 and compensate for water evaporated from the spray.

As previously mentioned, the gas in conduit 64 leaving the unit 62 preferably has a temperature in the range of from about 150° F. to 210° F., is slightly below atmospheric pressure, and contains water evaporated from the spray and the solution 63. At this temperature and pressure, the gas product in conduit 64 holds a substantial quantity of water vapor providing a means by which water can be continuously removed from the unit 62 to maintain a sufficiently high concentration of salt in the accumulated brine spray to facilitate collection of salt in the form of crystals as described. In addition, although the gas product is preferably subjected to further cleaning treatments in the gas conditioning unit 73, venturi scrubbers 80 and 82, and demister 83, the process is preferably controlled so that the temperature and pressure of the gas is maintained in the aforementioned elevated range up to the point at which the gas enters the stack 100. As a result, water does not accumulate in the process, but rather is continuously removed as vapor in the stack 100 with little or no liquid discharge that need be treated or disposed of and little or no exfiltration of the gas from the process during treatment.

It will be appreciated that the above-described embodiments of the present invention render the gas substantially free of HCl and particulates, and that the removal is accomplished with little or no liquid discharge from the process. Thus, the present invention, by substantially eliminating any liquid discharge attendant treatment of the gas, minimizes the environmental concerns associated with discharge of aqueous material into the environment. The invention is advantageous over known "spray dry" processes because the present process may be controlled more easily than the dry process and can be carried out using smaller and less complicated equipment, which facilitates movement of the equipment from site to site.

The following examples are provided to further illustrate the present invention but should not be considered as limiting the scope thereof. Unless otherwise indicated, all percentages are by weight, temperatures are in degrees Fahrenheit, and the processes are carried out under steady state conditions.

EXAMPLE 1

This example will be described with reference to the apparatus of FIG. 1. Waste gas in conduit 10 includes 2000 lbs./hr. of HCl and 10,500 lbs./hr. of water. The gas also contains 98 lbs./hr. of suspended particulates including 76 lbs./hr. of ash and 22 lbs./hr. of heavy metals, and is produced at a rate of 75,000 ft.$^3$/minute and a temperature of 2200° F.

The gas is quenched in chamber 16 by contacting it with a water spray from conduit 17 to reduce the temperature of the gas to 500° F. Water is delivered to the chamber at a rate of 27,500 lbs./hr. and at a temperature of 60° F. to quench the gas, and this amount of water vaporizes in and becomes a part of the gas so that the cooled gas carries 38,000 lbs./hr. of water.

Following quenching, suspended particulates are removed in the bag house 18 which is insulated to maintain the temperature of the gas at 500° F. Suspended particulates are removed in the bag house 18 at a rate of 97 lbs./hr. leaving 1 lb./hr. of suspended particulate in the gas exiting the bag house.

From the bag house 18, the gas is conducted to the reaction unit 26 and introduced into the alkaline brine solution 28 using the sparger 30. The solution 28 has a volume of 6,000 gallons, is at a temperature of 180° F., and includes 10% NaOH and 28% dissolved NaCl. As a result of contact with the solution, 99% of the HCl in the gas reacts with NaOH to form 3,200 lbs./hr. of NaCl and 1,000 lbs./hr. of water, and the gas temperature is reduced to 184° F. NaOH is consumed at a rate of 2,200 lbs./hr.

Heat transferred from the gas evaporates water from the brine at the rate of 7,200 lbs./hr. This continuous evaporation of water maintains the concentration of NaCl at the 28% level so that salt crystals form in the solution at a rate of 3,200 lbs./hr. About one-half or 0.5 lb./hr. of the 1 lb./hr. of suspended particulates present in the gas after passage through the bag house are removed from the gas as a result of contact between the gas and the solution, and settle out in unit with the salt crystals. The salt crystals and settled particulates are removed using the screw conveyor 42 and hydroclone 41, and the included brine portion is returned to the unit 26 in conduit 46.

The gas is conducted from the unit 26 to the scrubber 32 and carry residual HCl at a rate of 2 lbs./hr., water at a rate of 45,200 lbs./hr., and 0.5 lbs./hr. of suspended particulates. The gas is scrubbed to remove the residual chlorides and suspended particulates by introducing the gas into the bottom of the scrubber 32 and contacting the gas countercurrently with a downwardly flowing wash solution. The wash solution consists of 200,000 lb/hr of recycle liquor and fresh wash solution. The fresh wash solution is introduced into the scrubber at a rate 8,400 lbs./hr. and at a temperature of 60° F.

The fresh wash solution includes 6,200 lbs./hr. of water and 2,200 lbs./hr. of NaOH.

The residual HCl is completely reacted with NaOH in the scrubber 32 to produce 3 lbs./hr. of salt and 1.0 lb./hr. of water. The salt dissolves in the briney wash solution along with the water which is formed in the reaction. In addition, substantially all of the remaining suspended particulates are removed from the gas.

The briney wash solution is discharged into the unit 26 at a temperature of 180° F., and includes less than 1% salt and approximately 0.5 lb./hr. particulates. Gas exits the scrubber 32 at a rate of 35,800 ft.$^3$/minute and at a temperature of 184° F., and contains 45,200 lbs./hr. of water vapor. No liquid is discharged.

EXAMPLE 2

This example will be described with reference to the apparatus shown in FIG. 2. Waste gas produced at a rate of 75,000 ft.$^3$/minute and having the composition described in EXAMPLE 1 is contacted in the upper portion of the reaction unit 62 with an alkaline brine spray which includes 26% NaCl and 0.75% NaOH. The brine is introduced through nozzles 60 at a rate of 310,000 lbs./hr. at a temperature of 195° F.

As a result of contact between the gas and the spray, 1,970 lbs./hr. of the chlorides react with 2,175 lbs./hr. of NaOH to produce 3,200 lbs./hr. of salt and 950 lbs./hr. of water. Suspended particulates are washed from the gas and collected in the brine spray at a rate of 40 lbs./hr.

The temperature of the gas before the brine spray is 2200° F. and following contact with the spray is 200° F., with the heat transferred to the spray being reflected in the evaporation of water at a rate of 34,600 lbs./hr. and a resulting temperature of the spray at 195° F.

Following contact with the spray, the gas is conducted from the unit 62 in conduit 64 at a rate of 34,000 ft.$^3$/minute and contains 20 lbs./hr. HCl, 38 lbs./hr. suspended particulates, and 11 lbs./hr. entrained salt crystals. The brine spray accumulates in the tank portion 66 at a rate of 277,000 lbs./hr. with a salt concentration of 28%, along with 84 lbs./hr. of suspended particulates and 80,000 lbs./hr. of dissolved salt and 3,200 lbs./hr. of suspended salt crystals. Salt crystals form in the unit 62 at a rate of 3,200 lbs./hr.

The alkaline brine solution from tank 66 is circulated through hydroclone system 118 at a rate of 360,000 lbs./hr. In the system 118, 1,600 lbs./hr. of salt crystals are removed. The brine solution is returned to feed line 112 in conduit 120 at a rate of 267,000 lbs./hr. leaving a salt concentration of 28%. Also added to feed line 112 is 44,000 lbs./hr. of an alkaline brine solution which is drawn from sump 76 in conduit 145. The solution from sump 76 contains 32 lbs./hr. NaCl, 11,000 lb./hr. NaOH, and 40 lb./hr. suspended particulates.

Dewatering screw 70 removes 1,600 lbs./hr. NaCL from the bottom of tank 66 together with an included brine portion of 1,600 lb./hr., of which 1,400 lb./hr. are returned to the tank 66 in conduit 69 leading from separation means 71.

What is claimed is:

1. A process for the treatment of a waste gas containing hydrogen chloride wherein the gas is at an elevated temperature in the range of from about 300° F. to about 3000° F. and is produced from the thermal decomposition of material contaminated with chlorinated organic compounds, comprising:

contacting the waste gas in a reaction unit with an alkaline brine solution under conditions such that hydrogen chloride in the waste gas reacts with the alkali to form a chloride salt and water;

utilizing the heat of the waste gas to evaporate water from the brine solution to maintain the chloride salt concentration in the solution sufficiently high to cause the formation of chloride salt crystals therein;

removing the gas from the reaction unit following contact with the solution under conditions such that the gas includes the water evaporated from the brine solution;

removing the chloride salt crystals from the reaction unit; and adding water to the reaction unit to compensate for water vaporized from the solution, whereby hydrogen chloride is removed from the waste gas with a minimum of liquid discharge.

2. The process of claim 1, wherein the chloride salt crystals which are removed from the reaction unit have an included brine portion and the process further comprises separating the chloride salt crystals from the included brine portion and returning the brine portion to the unit.

3. The process of claim 1, wherein the alkali is sodium hydroxide and is provided in the brine solution for reaction with the waste gas by withdrawing a portion of the brine solution from the reaction unit, adding sodium hydroxide to the withdrawn portion, and returning the withdrawn portion and added sodium hydroxide to the unit.

4. The process of claim 3, wherein water is added to the reaction unit to compensate for water vaporized from the solution by adding the water to the withdrawn portion of the brine solution prior to its return to the unit.

5. The process of claim 1, wherein residual hydrogen chloride is present in the gas which is removed from the unit and the process further comprises treating the gas to remove residual hydrogen chloride by contacting the gas with a wash solution having a chloride salt concentration which is below the saturation level of the chloride salt and at least a stoichiometric amount of an alkali for reaction with the residual hydrogen chloride, and returning the wash solution to the unit following contact with the gas.

6. The process of claim 5, wherein the water which is included in the wash solution returned to the unit is sufficient to compensate for water vaporized from the solution in the unit and removed with the gas.

7. The process of claim 5, wherein the alkali is sodium hydroxide and is provided in the brine solution in the unit for reaction with hydrogen chloride in the incoming waste gas by adding a quantity of sodium hydroxide to the wash solution returned to the unit which is in excess of that required for reaction with the residual hydrogen chloride.

8. The process of claims 1, 2, 4, 5, 6 or 7, wherein the temperature of the gas which is removed from the reaction unit is maintained in the range of from about 150° F. to about 210° F.

9. The process of claim 8, wherein the alkali is sodium hydroxide and concentration of sodium chloride in the brine solution in the unit is maintained in the range of from about 26% to about 30% based on the total weight of the solution.

10. A process for the treatment of waste gas containing hydrogen chloride and suspended particulates including heavy metals and ash, the gas being at a temperature in the range of from about 1600° F. to about 3000° F. and being produced from the thermal decomposition of materials contaminated with chlorinated organic compounds, comprising:

quenching the gas using a water spray to reduce the gas temperature to a temperature in the range of from about 300° F. to about 600° F. under conditions such that the water completely vaporizes in the waste gas and the hydrogen chloride in the gas remains substantially unreacted during quenching;

substantially removing suspended particulates from the waste gas following quenching while maintaining the temperature of the gas above about 300° F.;

contacting the waste gas in a reaction unit with an alkaline brine solution under conditions such that hydrogen chloride in the waste gas reacts with the alkali to form a chloride salt and water;

utilizing the heat of the waste gas to evaporate water from the brine solution to maintain the concentration of the chloride salt in the solution sufficiently high to cause the formation of chloride salt crystals therein;

removing the gas from the reaction unit following contact with the solution under conditions such that the gas includes the water evaporated from the solution;

removing the chloride salt crystals from the unit; and adding water to the reaction unit to compensate for water vaporized from the solution whereby hydrogen chloride is removed from the waste gas with a minimum of liquid discharge.

11. The process of claim 10, wherein residual hydrogen chloride is present in the gas which is removed from the unit and the process further comprises treating the gas to remove residual hydrogen chloride by contacting the gas with a wash solution having a chloride salt concentration which is below the saturation level of the chloride salt and at least a stoichiometric amount of the alkali for reaction with the residual hydrogen chloride, and under conditions such that the residual hydrogen chloride in the gas reacts with the alkali in the wash solution to form the chloride salt and water and such that the chloride salt which is formed is dissolved in the wash solution, and returning the wash solution including dissolved chloride salt to the reaction unit, whereby residual hydrogen chloride in the gas is substantially removed.

12. The process of claim 11, wherein the alkali is sodium hydroxide and is provided in the brine solution in the unit for reaction with chlorides in the incoming waste gas by adding a quantity of sodium hydroxide to the wash solution returned to the unit which is in excess of that required for reaction with the residual hydrogen chloride.

13. The process of claim 11, wherein the water which is included in the wash solution returned to the unit is sufficient to compensate for water vaporized from the solution in the unit and removed with the gas.

14. The process of claim 10 or 11, wherein the temperature of the gas which is removed from the reaction unit is maintained in the range of from about 150° F. to about 210° F.

15. The process of claim 14, wherein the alkali is sodium hydroxide and the concentration of sodium chloride in the aqueous solution in the unit is maintained in the range of from about 26% to about 30% based on the total weight of the solution.

16. The process of claims 10, 11, 12 or 13, wherein the waste gas is contacted with the alkaline brine solution and the heat of the waste gas is utilized to evaporate water from the solution by collecting the solution in the unit to form a bath and introducing the waste gas into the solution below the surface of the bath.

17. A process for the treatment of waste gas containing hydrogen chloride and suspended particulates including heavy metals and ash, the gas being at a temperature in the range of from about 1600° F. to about 3000° F. and being produced from the thermal decomposition of material contaminated with chlorinated organic compounds, comprising:

contacting the waste gas in a reaction unit with an alkaline brine spray under conditions such that hydrogen chloride in the waste gas reacts with the alkali to form a chloride salt, a substantial portion of the chloride salt is collected in the spray, and a substantial portion of the suspended particulates are washed from the waste gas by the spray, resulting in a gas product having a reduced concentration of hydrogen chloride and suspended particulates;

accumulating the alkaline brine spray and included particulates and chloride salt in the reaction unit to form an alkaline brine solution thereof;

utilizing the heat of the waste gas to evaporate water from the alkaline brine spray to maintain the concentration of the chloride salt in the spray sufficiently high to cause the formation of chloride salt crystals therein;

removing particulates and salt crystals from the brine solution accumulated in the unit;

removing the gas from the reaction unit following contact with the spray under conditions such that the gas includes the water evaporated from the spray; and providing a sufficient quantity of water in the reaction unit to ensure maintenance of a substantially constant volume of the brine solution, whereby hydrogen chloride and suspended particulates are removed from the waste gas with a minimum of liquid discharge.

18. The process of claim 17, wherein the particulates and chloride salt crystals are removed from the unit by allowing the same to settle out in the brine solution, removing the settled particulates and chloride salt crystals from the unit along with an included brine portion, separating the included brine portion from the particulates and chloride salt crystals, and returning the brine portion to the reaction unit.

19. THe process of claim 18, wherein the alkali in the alkaline brine spray is sodium hydroxide, the temperature of the brine solution accumulating in the unit is maintained in the range of from about 150° F. to about 210° F. and the concentration of chloride salt therein is maintained substantially in the range of from about 26% to about 30%.

20. The process of claim 17, 18 or 19, wherein a portion of the brine solution accumulating in the unit is continuously removed from the reaction unit and cleared of at least a portion of the suspended particulates and chloride salt crystals contained therein to produce a cleared brine solution and a substantially solid product representing removed particulates and chloride salt crystals, and at least a portion of the cleared brine solution is added to the spray prior to its contact with the waste gas.

* * * * *

UNITED STATES PATENT AND TRADEMARK OFFICE
CERTIFICATE OF CORRECTION

PATENT NO. : 4,990,317
DATED : February 5, 1991
INVENTOR(S) : Kai K. Mak and Rudy G. Novak It is certified that error appears in the above-identified patent and that said Letters Patent is hereby corrected as shown below:

Column 5, line 55, "digramamtically" should be --diagrammatically--.

Column 8, line 64, "HCL" should be --HCl--.

Column 8, line 67, "PH" should be --pH--.

Column 8, line 68, "PH" should be --pH--.

Column 9, line 1, "PH" should be --pH--.

Column 9, line 2, "PH" should be --pH--.

Column 9, line 3, "PH" should be --pH--.

Column 11, line 64, "41" should be --50--.

Column 12, line 64, "NaCL" should be --NaCl--.

Signed and Sealed this

Fourth Day of August, 1992

Attest:

DOUGLAS B. COMER

*Attesting Officer*  *Acting Commissioner of Patents and Trademarks*